United States Patent [19]

Lock

[11] Patent Number: 4,859,134
[45] Date of Patent: Aug. 22, 1989

[54] FOLDABLE RAMP EXTENSION FOR WHEEL LIFT APPARATUS

[75] Inventor: Walter G. Lock, Signal Mountain, Tenn.

[73] Assignee: Holmes International Inc., Chattanooga, Tenn.

[21] Appl. No.: 183,044

[22] Filed: Apr. 19, 1988

[51] Int. Cl.$^4$ .............................................. B60P 3/12
[52] U.S. Cl. ................... 414/563; 280/402; 414/430
[58] Field of Search ............... 414/563, 426–430; 280/402

[56] References Cited

U.S. PATENT DOCUMENTS

| | | | |
|---|---|---|---|
| 2,776,063 | 1/1957 | Larson | 414/430 |
| 3,690,482 | 9/1972 | Gaumont | 414/563 |
| 3,828,953 | 8/1974 | Reznicek | 414/428 |
| 4,036,384 | 7/1977 | Johnson | 414/430 |
| 4,225,279 | 9/1980 | Boyer | 414/430 X |
| 4,350,470 | 9/1982 | Murillo | 414/430 |
| 4,737,066 | 4/1988 | Allison, Jr. | 414/563 |
| 4,750,856 | 6/1988 | Lapiolahti | 280/402 X |

FOREIGN PATENT DOCUMENTS 986155  3/1976  Canada .......................... 280/402

Primary Examiner—David A. Bucci
Attorney, Agent, or Firm—Alan Ruderman

[57] ABSTRACT

Wheel lift towing apparatus has tire support cradles including front and rear support members for respectively engaging the front and rear surface portions of the vehicle tire. The front support member includes a fixed ramp for engaging a lower front surface portion of the tire and a moveable ramp in the form of a pivotable plate disposed above the fixed ramp to provide an extension thereof for engaging an additional front surface portion of the tire above the surface engaged by the fixed ramp. The pivotable plate may be rotated downwardly to a stow or inoperative position, and in such position permits the cradle to enter beneath the front of a low ground clearance vehicle to be towed. Once under the front of the vehicle and adjacent the front tire it may be rotated to the operative position and a support member pivotably journalled to the opposite surface of the plate may be positioned against stop members to hold the plate at an upstanding inclination in the operative position. When the plate is moved to the stow position the support member is lifted above the stop members to permit the plate to be folded downwardly onto the top of the cradle housing with the support member draped downwardly out of the way.

18 Claims, 2 Drawing Sheets

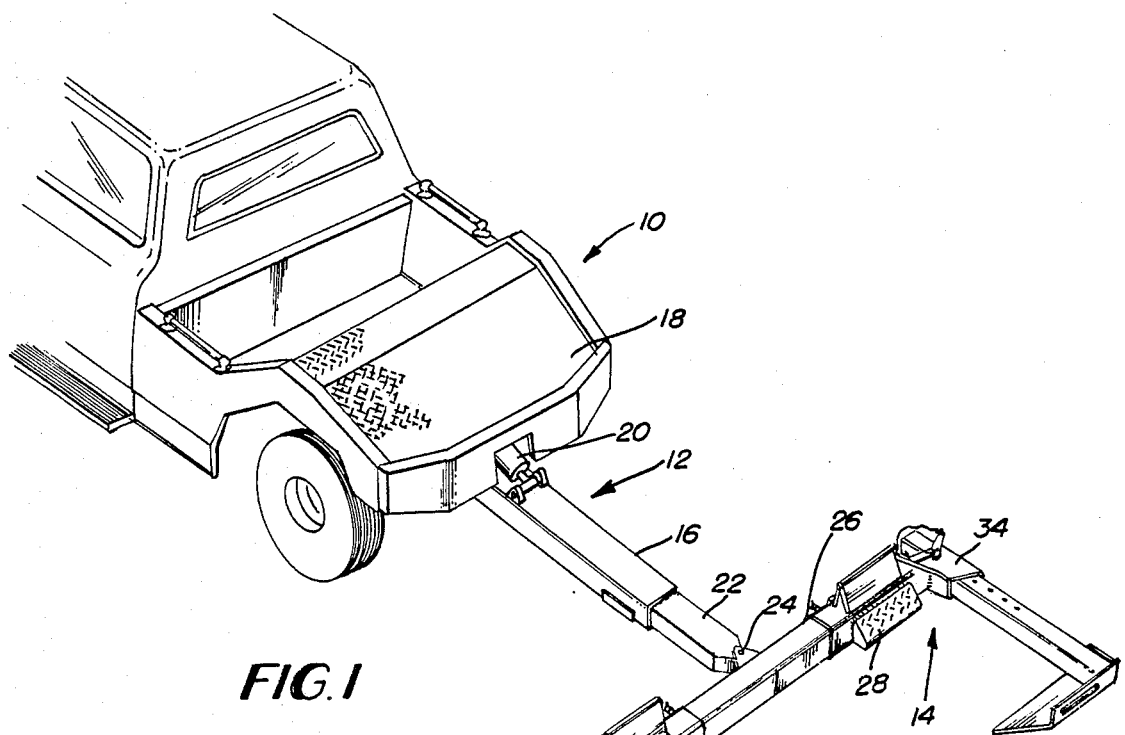
FIG. 1
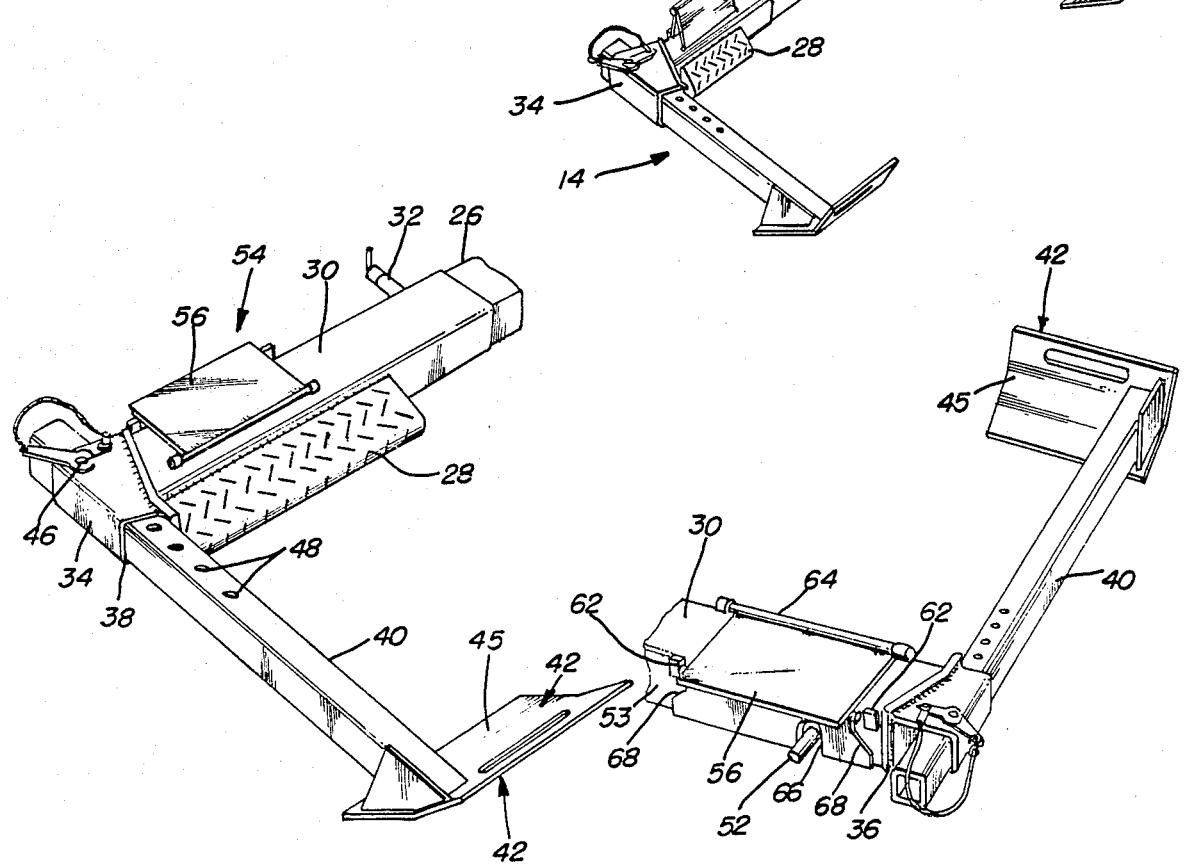
FIG. 4
FIG. 5

FOLDABLE RAMP EXTENSION FOR WHEEL LIFT APPARATUS

BACKGROUND OF THE INVENTION

This invention relates to towing vehicles and more particularly to an extendible ramp on the front of a wheel lift tow bar for providing support to the front of the wheels or tires of a vehicle being towed.

Because of the large amount of plastic material used on the front and rear portions and bumpers of recent model automobiles, developments in the art of lifting and towing disabled vehicles by a towing vehicle have been directed toward what is known in the art as "wheel lift" devices, which engage and lift the front or rear tires of a disabled vehicle. Examples of towing apparatus incorporating such devices are illustrated in Wagner U.S. Pat. No. 3,182,829; Bubik U.S. Pat. No. 3,897,879; Cannon et al U.S. Pat. No. 4,451,193; Brown U.S. Pat. No. 4,473,334; Porter et al U.S. Pat. No. 4,573,857; Hamman U.S. Pat. No. 4,634,337; Bubik U.S. Pat. No. 4,637,623 and Holmes U.S. Pat. No. 4,679,978. As disclosed in each of these patents the tires of a disabled vehicle are disposed within the well of some form of cradle, the cradle having members which engage and support the front and rear of the tires carried therein.

The wheel supporting cradles generally have a fork of a substantially U-shaped configuration in plan, the legs of the cradle opening either inwardly, outwardly or rearwardly. In the latter instance the open position is closed by a retaining member subsequent to the tire being disposed within the well, the retaining member engaging the rear of the tire. In the former cases, the rear of the tire is engaged by an arm, commonly known in the art as an "L" arm since it has that configuration, and such arm may have an upstanding arcuate contour conforming somewhat to the shape of the tire so as to provide greater support by the larger surface contact with the tire. Examples of the former "L" arm configurations are illustrated in at least the aforesaid Porter et al and Holmes patent, while examples of the latter "L" arm configurations are illustrated in at least Wagner and the Bubik '623 patents.

The front of the tire generally merely rests on a ramp either formed on the front leg of the U-shaped cradle, as in Cannon et al and Porter et al, or formed on the rear of a laterally extending cross arm or tow bar which carries the "L" arms at its extremities, such as in Bubik '623 and Holmes. In Wagner, both the front and rear support for the tires is provided by spaced apart arcuate shaped plates or feet which are connected together by chains so that both the front and rear of the tire is engaged by the greater surface contact provided by these contoured feet. However, in Wagner the feet on both sides of the vehicle are carried by a respective arm depending downwardly from a frame supported above the vehicle to be towed, and the entire wheel lift apparatus is difficult to utilize effectively. This is one reason the art has developed in the direction of engaging the tires with a wheel lift device which enters from beneath the disabled vehicle.

When a disabled vehicle is being towed, it is highly desirable that the tires rest securely within the cradle so that the momentum of the disabled vehicle does not result in the tires rolling and disengaging from the cradle when the towing vehicle accelerates or stops. On acceleration, the disabled vehicle and the tires tend to surge rearwardly, but upon stopping of the towing vehicle, the disabled vehicle and the tires tend to surge forwardly. Accordingly, it is highly desirable to have enlarged wheel engaging feet at the front and rear of the cradle.

One of the problems presented when engaging the tires from beneath the vehicle is that modern automobiles have a low configuration, that is, they are built low to the ground and the bodies thereof have low ground clearance and small clearance between the tire wells and the tires. Thus, if the cradle has enlarged feet, the low clearance prevents the feet from entering beneath the automobile from, for example, the front of the vehicle. If a large foot is desirable to support the front of the tire of the disabled vehicle, then the prior art, as exemplified by the aforesaid Porter et al patent, has not utilized a foot at the rear of the tire but has provided means for rotating the rear support of the cradle outwardly from beneath the vehicle. However, even here if the disabled vehicle has a very low ground clearance at the front, the upstanding foot will not slip beneath the body of the vehicle into the tire engaging position. If a large foot is desired to support the rear of the disabled tire, the foot may be rotated inwardly from the outboard side of the vehicle, as exemplified by the Bubik '623 patent. However, as illustrated in that patent, the front support is merely a ramp on the cross bar or the like since a large foot for supporting the front of the tire will not enter beneath the low ground clearance front end of late model vehicles.

SUMMARY OF THE INVENTION

Consequently, it is a primary object of the present invention to provide a cradle for wheel lift device towing vehicles for supporting a tire of a disabled vehicle for towing, the cradle having an enlarged foot portion at the front end for supporting the front surface of the tire to minimize the possibility of the tire rolling forwardly when the towing vehicle stops, the foot portion having means for permitting it to enter beneath the front end of low ground clearance disabled vehicles.

It is another object of the present invention to provide for a wheel lift towing device, a tire supporting cradle carried by a transverse support beam, the cradle having an enlarged foot for engaging and providing support for a front surface of a tire of a disabled vehicle, the foot including a plate which may be folded from a stow position to a raised operative position where it may engage the tire, the stow position permitting the plate to enter beneath the front of a low ground clearance body disabled vehicle.

It is a further object of the present invention to provide apparatus for use in lifting and towing a vehicle, the apparatus including a tire support cradle carried by a transversely extending support beam, the cradle having means for engaging and supporting a rear surface of the tire of the vehicle and having a ramp at the front for engaging and supporting a front surface of the tire, and additionally having a foldable plate mounted in juxtaposition with the ramp for providing an extension of the ramp in an upright operative position for engaging an additional portion of the front surface of the tire, and for folding down to an inoperative stow position when not in use and for entering beneath the front of a low ground clearance vehicle for subsequent use for engaging the tire.

Accordingly, the present invention provides apparatus for a wheel lift towing vehicle for supporting the tires of a vehicle lifted and towed thereby, the apparatus including a tire support cradle having front and rear members for respectively engaging the front and rear surface portions of a tire of the vehicle. The front member includes a fixed ramp for engaging a lower front surface portion of the tire and a moveable ramp in the form of foldable plate means which may be juxtaposed above the fixed ramp to provide an extension thereof for engaging an additional front surface portion of the tire above the surface engaged by the fixed ramp, thereby to provide additional support to the front of the tire when carried in the cradle.

The foldable plate means may be folded when not in use to a stow position wherein it does not form an extension of the fixed ramp, and in such position the cradle is permitted to enter beneath a low ground clearance vehicle to be towed without interference of the moveable ramp therewith. Once under the front of the vehicle and adjacent the front tire it may be unfolded to the operative position. Preferably, the moveable ramp comprises a plate pivotably mounted above the fixed ramp, and means for holding the plate in a raised operative position for providing an extension to the fixed ramp so as to engage the tire.

In the preferred embodiment, the plate is pivotably mounted on an upper surface of the cradle which may be the upper surface of the transverse support beam which carries the cradles, or a telescoping housing positioned on the support beam, and a support member may be pivotably attached to the underside of the plate, the end of the support member remote from the attachment with the plate acting against a forward stop member on the upper surface to hold the plate in the raised or upstanding operative position. When the moveable ramp is to be moved to the stow position, the support member is lifted above the stop member so that the plate may be folded by pivoting downwardly. It is preferred that when this occurs, the plate lay on the upper surface and that the support member be disposed in a downward position so as to be draped over the front surface of the cradle or support beam.

BRIEF DESCRIPTION OF THE DRAWINGS

The particular features and advantages of the invention as well as other objects will become apparent from the following description taken in connection with the accompanying drawings, in which:

FIG. 1 is a rear perspective view of a towing vehicle looking forwardly having wheel lift apparatus illustrated as partly extended incorporating wheel engaging cradles constructed in accordance with the principles of the present invention;

FIG. 4 is a rear perspective view similar to FIG. 3, but with the moveable ramp in the stow position;

FIG. 5 is a front perspective view similar to FIG. 2, but with the moveable ramp in the stow position.

DESCRIPTION OF THE PREFERRED EMBODIMENT

Figure 2:
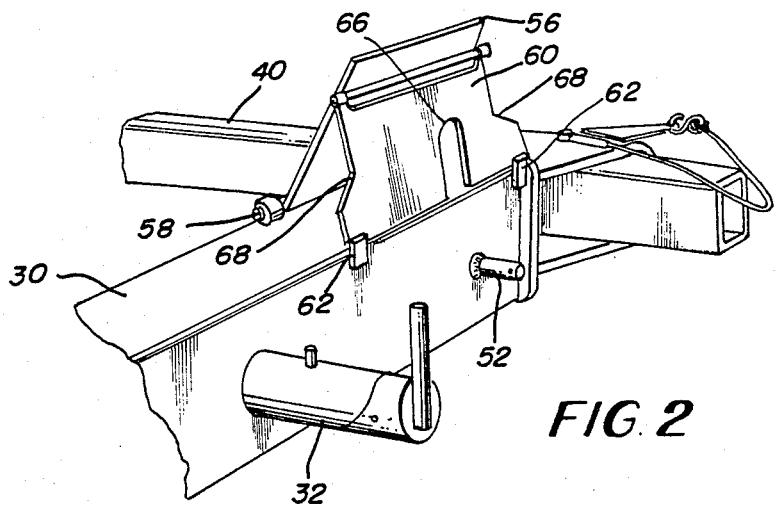
FIG. 2 is a fragmentary front perspective view looking rearwardly of the front end of a portion of a cradle constructed in accordance with the present invention with the moveable ramp in the operative position.

Referring to the drawings, a towing vehicle 10 is illustrated having wheel lifting apparatus 12 incorporating wheel supporting cradles 14 constructed in accordance with the principles of the present invention. The wheel lifting apparatus 12 includes a hollow boom housing 16 which may be extended by extension means disposed within the bed 18 of the towing vehicle, and may be tilted by tilting means including a tilt cylinder 20 as fully disclosed in the aforesaid Hamman U.S. Pat. No. 4,634,337 assigned to the common assignee of the present invention. Telescopically disposed within the lifting boom housing 16 is at least one inner or lifting boom 22 which may be extended and retracted relative to the lifting boom housing 16 in conventional manner.

Mounted at the free end of the inner boom 22 by means of a journal pin 24 is a tow bar or cross beam 26 which may pivot relative to the inner boom 22 about the journal pin 24. At each end of the transversely extending tow bar is one of the wheel supporting cradles 14.

The wheel lift cradles 14 may be formed as separate attachments telescopically received on the ends of the tow bar 26, or each cradle may have elements formed integral with the tow bar. In either instance the cradle includes a fixed front support ramp 28 secured to a support member, the support member either being the tow bar 26, but preferably are hollow housings 30 conforming in shape to the tow bar and telescopically received on the opposed ends of the tow bar and locked thereon in transversely selected positions by spring biased pins 32 or the like. Each cradle includes a fixed receptacle 34 at the outer end of the support member 30 at the outboard side of the ramp 28, the receptacle comprising a hollow body having a rectangular passageway tapering in the horizontal plane from an enlarged end 36 facing the towing vehicle toward a smaller end 38 facing the vehicle to be towed, but having a substantially fixed height in the vertical plane. A rear wheel support member, i.e., a member for supporting the rear surface of the tire to be carried in the cradle includes an elongated arm 40 having a rectangular configuration which is telescopically positioned within the receptacle, and a wheel engaging blade member 42. The blade 42 is a scoop-like upstanding plate member angularly disposed relative to the arm 40 so as to provide support for the rear surface of the tire 44, and preferably has at least one or more bends 45 in the horizontal plane to form the interior surface of the blade to simulate a concave configuration for conforming to the shape of the tire. The arm 40 may be slidably moved horizontally in the receptacle 34 to permit the blade to engage the tire and the arm is then locked in the receptacle by means of a pin 46 which enters an aperture in the receptacle adjacent the enlarged end thereof and extends into one of a selected number of bores 48 in the arm.

Conventionally the inner beam 22 of the lifting apparatus would be extended to engage the ramp 28 with the front surface of the tire 44 and the blade adjusted to engage the rear surface thereof. Straps in the form of chains 50 or the like then are positioned about the periphery of the tire, the chains being attached to a peg 52 fixed to the front surface 53 of the tow bar 26 or the housing 30 to securely tie the tire down into the cradle supported between the ramp 28 at the front surface of the tire and the blade 42 at the rear surface thereof.

Since the ramp 28 should not extend below the bottom of the tow bar where it would preclude the tow bar from being lowered to the ground for entering under the vehicle to be towed, and since the ramp should not extend above the top of the tow bar lest it engage the bumper or other portions of low lying or low ground clearance vehicles, in the prior art the front surface of the tire 44 is only supported by the small inclined surface of the ramp 28 and if the towing vehicle makes a sudden stop, the momentum of the towed vehicle has a tendency to cause the tires to roll forwardly up the respective ramp.

Figure 3:
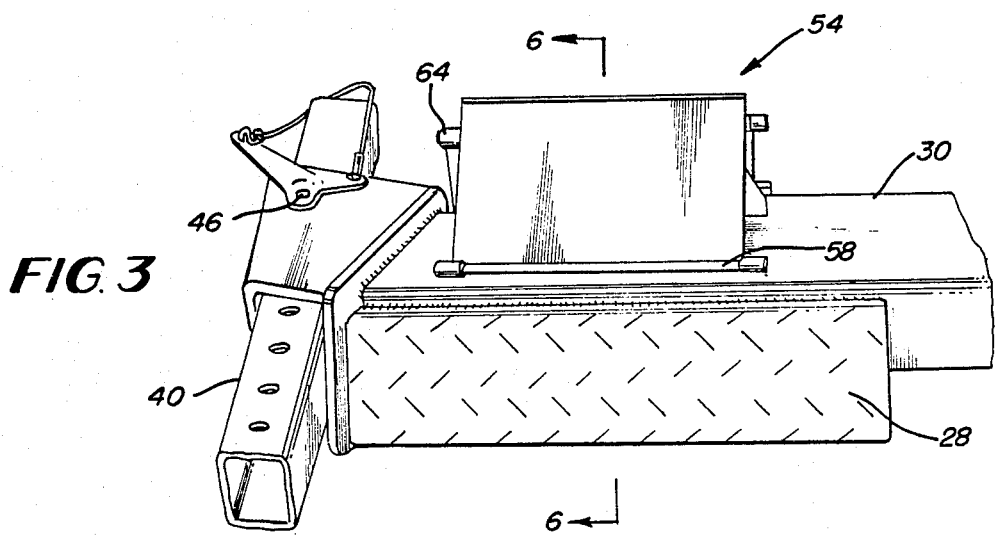
FIG. 3 is a fragmentary rear perspective view of the front end of the cradle illustrated in FIG. 2 with the moveable ramp in the operative position.

The present invention solves this problem in the prior art wheel lifting devices without providing an obstacle to the entry of the tow bar beneath low ground clearance vehicles by providing a moveable ramp 54 at a disposition above and forwardly of the fixed ramp 28, the moveable ramp being raised to an operative position as illustrated in FIGS. 2 and 3 or lowered to a stow position as illustrated in FIGS. 4 and 5. In the operative position the moveable ramp provides an extension of the fixed ramp 28, while in the stow position, it is disposed so as not to present an obstacle to entry of the tow bar beneath the vehicle to be towed while the tow bar is being so positioned, nor does it present a visually unappealing protuberance when the boom has been retracted and no vehicle is in tow.

Figure 6:
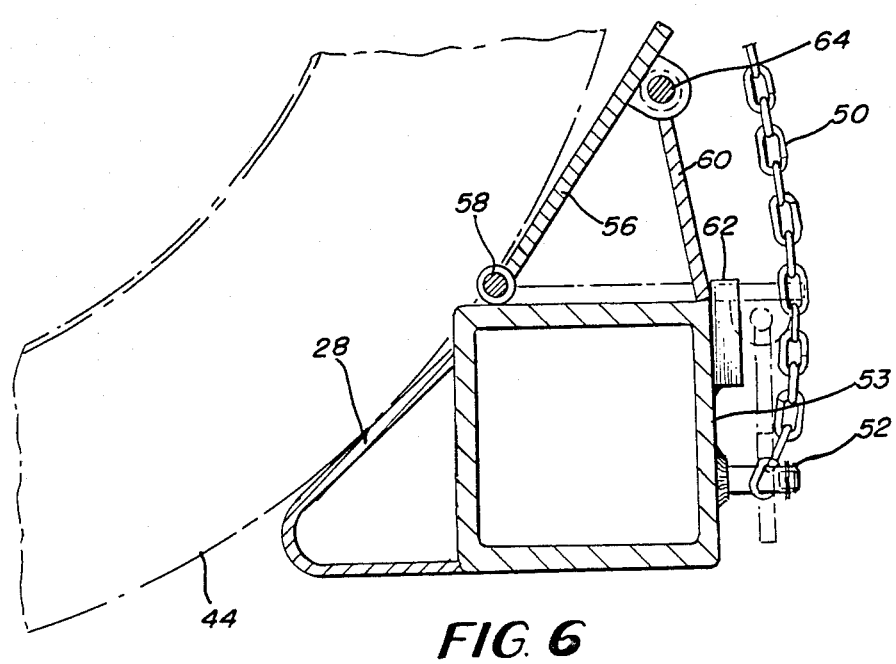
FIG. 6 is a cross sectional view taken along line 6—6 of FIG. 3 illustrating a tire of a vehicle to be towed supported in the cradle and engaging the moveable ramp.

In the preferred form of the invention, the moveable ramp 54 comprises a foldable plate 56 hingedly connected to the support surface formed by the top of the housing 30 (or the top of the tow bar itself if desired) at a journal 58 above and forwardly of the ramp 28. The plate 56 may be raised to an upstanding inclined operative position so as to form an extension of the ramp 28 as illustrated in FIGS. 2, 3 and 6, or may be lowered to a stow position onto the top of the support surface of the housing 30, as illustrated in FIGS. 4 and 5. To hold the plate 56 in the operative position, a support member 60 is positioned against the surface of the plate 56 remote from the tire 44, i.e., the forward (looking toward the towing vehicle) end of the plate 56 when in the raised position, and releasably locked in that position by abutting against a stop member 62 preventing the support member 56 from slipping forwardly. As illustrated, the preferred form of the support member 60 is a plate having one edge hingedly connected to the plate 56 at a journal 54 and its other end adapted to be selectedly manually positioned against the stop 62.

The stop 62, in the preferred embodiment, comprises a pair of spaced tabs welded to the front surface 53 of the tow bar housing 30 and protruding above the upper support surface. The location of the journal 64 on the plate 56 and the length of the support plate 60 is such that the foldable ramp plate 56 in the operative position may be disposed at an incline so that it forms a continuation of the fixed ramp 28 and at a slight angle thereto to provide in concert a somewhat concave support surface for the tire 44. Additionally, the location of the journal 64 and the length of the support plate 60 is such that when the edge of the support plate 60 remote from the journal 64 abuts the stop tabs 62, the forces due to the tire and the towed vehicle are directed toward and counteracted by the stops 62 so that the foldable ramp plate 56 will not slip forwardly, the weight of the vehicle preventing it from pivoting rearwardly. Furthermore, the position of the journal 64 relative to the width of the top support surface of the housing 30 is such that in the stow position the journal is disposed forwardly of the upper support surface of the tow bar housing 30 on which the journal 58 is carried. Consequently, when in the stow position, the support plate 58 may be draped downwardly along the front surface 53, and to this end preferably has a slot 66 for clearing the peg 52, and an indentation 68 at each end to provide a clearance for the stop tabs 62.

In operation, when the tow bar is to be positioned beneath a vehicle to be towed, the plate 56 is postioned in the stow position so that it does not provide an obstacle to interfere with those portions of the vehicle which are positioned closely to the ground. After the fixed ramps are positioned closely adjacent the front of the respective tire 44, and possibly also after the respective blade members 42 are positioned against the rear of the respective tires 44, the operator may then merely lift the plate 56 and position the plate 60 against the stop tab 62. This is done in both cradles and after the chains 50 are attached and the disabled tires are lifted, the tires are supported securely in the cradles by the fixed ramps 28 and the foldable plate ramps 56 at the front surfaces, and by the blade members 42 at the rear surfaces. When not in operation, the plates 56 are merely pivoted to the stow position and the respective support plates draped downwardly along the respective surfaces 53.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature if the invention, what is claimed herein is:

1. Apparatus for use with wheel lift towing apparatus for supporting a pair of transversely spaced tires of a vehicle lifted and towed thereby, said apparatus comprising a transversely elongated tow bar adapted to be positioned beneath the vehicle, a pair of tire support cradles, each of said cradles having a front support means including mounting means carried by a respective end portion of said tow bar for supporting a front surface portion of a first of said tires and rear support means for supporting a rear surface portion of said first tire, said front support means comprising an inclined ramp fixed to said mounting means for supporting a first part of said front portion, and a foldable ramp, and means for mounting said foldable ramp on said mounting means in juxtaposition with and above said fixed ramp for moving between an operative position for providing an extension of said fixed ramp for supporting an additional part of said front surface above said first part and an inoperative position disposed on said mounting means.

2. Apparatus as recited in claim 1, wherein said foldable ramp comprises a plate, journal means for pivotably mounting said plate on said mounting means for rotation about a transverse axis between said operative position at a generally inclined disposition and said inoperative position, and retaining means for releasably holding said plate in said operative position and for permitting said plate to rotate about said journal means to said inoperative position.

3. Apparatus as recited in claim 2, wherein said retaining means comprises a support member, hinge means for pivotably journalling said support member on said plate remote from said journal means, said support member having a free end spaced from said hinge means, and stop means secured to said mounting means spaced forwardly of said journal means for abutting said free end and precluding said free end from moving forwardly when said plate is in the operative position.

4. Apparatus as recited in claim 1, wherein said rear support means comprises an elongated arm having one end adjustably connected to said mounting means transversely outwardly from said ramps, and a tire engaging blade connected to said arm at another end, said blade extending transversely inwardly relatively to said arm so as to be substantially aligned transversely with said ramps.

5. Apparatus as recited in claim 4, wherein said foldable ramp comprises a plate, journal means for pivotably mounting said plate on said mounting means for rotation about a transverse axis between said operative position at a generally inclined disposition and said inoperative position, and retaining means for releasably holding said plate in said operative position and for permitting said plate to rotate about said journal means to said inoperative position.

6. Apparatus as recited in claim 5, wherein said retaining means comprises a support member, hinge means for pivotably journalling said support member on said plate remote from said journal means, said support member having a free end spaced from said hinge means, and stop means secured to said mounting means spaced forwardly of said journal means for abutting said free end and precluding said free end from moving forwardly when said plate is in the operative position.

7. Apparatus as recited in claim 1, wherein said mounting means comprises a hollow housing telescopically positioned on said tow bar at a respective transverse end, said housing having a substantially planar upper surface, a forwardly disposed face and a rearwardly disposed face, said inclined ramp being fixed on said rearwardly disposed face, said foldable ramp comprising a plate pivotably journalled on said housing intermediate said inclined ramp and said forwardly disposed face for rotation about a transverse axis.

8. Apparatus as recited in claim 7, wherein said plate is pivotably journalled on said upper surface for rotation from said operative position wherein said plate is inclined relatively to said upper surface to said inoperative position where a non-tire engaging surface of said plate may be disposed on said upper surface.

9. Apparatus as recited in claim 8, including retaining means for releasably holding said plate in said operative position and for permitting said plate to rotate to said inoperative position.

10. Apparatus as recited in claim 9, wherein said retaining means comprises a support member, hinge means for pivotably journalling said support member to said plate on said non-tire engaging surface for rotation relatively thereto, said support member having a free end spaced from said hinge means, and stop means on said housing for abutting and precluding said free end from moving toward said forwardly disposed face when said plate is in the operative position.

11. Apparatus as recited in claim 10, wherein said hinge means is disposed at a location on said plate such that when in said inoperative position, said support member is draped downwardly adjacent said forwardly disposed face.

12. Apparatus as recited in claim 10, wherein said stop means comprises protuberances disposed above said upper surface.

13. Apparatus as recited in claim 12, wherein said stop means comprises tabs fixed to said forwardly disposed face.

14. Apparatus as recited in claim 12, wherein said hinge means is disposed at a location on said plate such that when in said inoperative position, said support member is draped downwardly adjacent said forwardly disposed face.

15. Apparatus for use with wheel lift towing apparatus for supporting a pair of transversely spaced tires of a vehicle lifted and towed thereby, said apparatus comprising a transversely elongated tow bar adapted to be positioned beneath the vehicle, a pair of tire support cradles, each of said cradles having front support means including mounting means carried by a respective end portion of said tow bar for supporting a front surface portion a first of said tires and rear support means for supporting a rear surface portion of said first tire, said front support means comprising a fixed ramp secured to said mounting means, and a foldable plate juxtaposed relative to said fixed ramp and pivotably mounted for moving relatively to said fixed ramp from an operative position providing an extension of said fixed ramp to an inoperative position.

16. Apparatus as recited in claim 15, wherein said mounting means comprises a hollow housing telescopically positioned on said tow bar at a respective transverse end, said housing having a substantially planar upper surface, a forwardly disposed face and a rearwardly disposed face, said fixed ramp being secured to said rearwardly disposed face, and said foldable plate means being journalled adjacent said fixed ramp for rotation about a transverse axis.

17. Apparatus as recited in claim 16, including retaining means for releasably holding said plate in said operative position and for permitting said plate to rotate to said inoperative position.

18. Apparatus as recited in claim 17, wherein said retaining means comprises a support member, hinge means for journalling said support member on said plate, said support member having a free end spaced from said hinge means, and stop means secured to said housing for abutting said free end and precluding said free end and said plate from moving when said plate is in the operative position and engaged by a tire.

* * * * *